United States Patent [19]

Maciolek

[11] 4,032,083

[45] June 28, 1977

[54] AUTOMATIC GAIN CONTROL FOR STABILITY AUGMENTATION SYSTEMS

[75] Inventor: Joseph R. Maciolek, Newtown, Conn.

[73] Assignee: United Technologies Corporation, Hartford, Conn.

[22] Filed: Apr. 12, 1976

[21] Appl. No.: 675,707

[52] U.S. Cl. .............................. 244/17.13; 73/65; 73/178 H; 235/150.2; 244/178

[51] Int. Cl.² ........................................ B64C 11/44

[58] Field of Search .............. 73/178 R, 178 H, 65; 235/150.1, 150.2, 150.22, 150.26; 244/17.13, 178, 179, 182, 195; 318/561, 619, 620

[56] References Cited

UNITED STATES PATENTS

| 3,071,335 | 1/1963 | Carter, Jr. ............... 244/17.13 X |
| 3,194,058 | 7/1965 | Kurkjian .................... 73/65 |
| 3,701,279 | 10/1972 | Harris et al. ................ 73/65 |

FOREIGN PATENTS OR APPLICATIONS 624,266   7/1961   Canada .................................. 73/65

OTHER PUBLICATIONS

Hawkins, B.J., "Stan-for Aircraft Take-off Weight and Balance", *Instruments & Control Systems*, 2-1965, pp. 89–93.

*Primary Examiner*—Stephen G. Kunin

[57] ABSTRACT

The gain of a stability augmentation system for an aircraft, particularly a helicopter, is automatically varied in accordance with the gross weight and deviations of the center of gravity of the aircraft. Gross weight and center of gravity are identified from in-flight measurements of collective and cyclic pitch stick position and airspeed. The gain of the stability augmentation system will not be changed during periods when the aircraft is being maneuvered.

15 Claims, 1 Drawing Figure

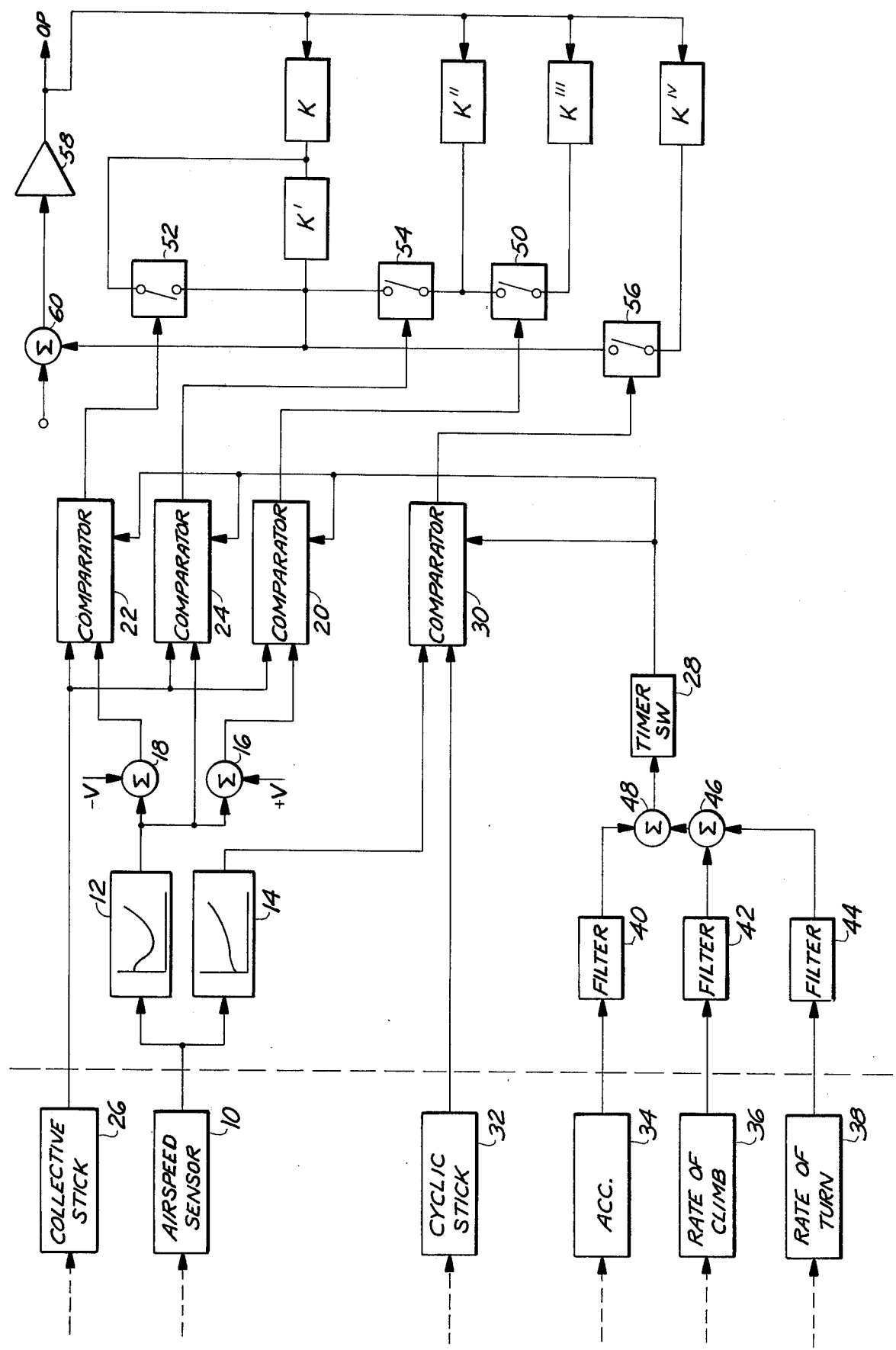

AUTOMATIC GAIN CONTROL FOR STABILITY AUGMENTATION SYSTEMS

BACKGROUND OF THE INVENTION

1. Field of the Invention

The present invention relates to facilitating the operation of aircraft and particularly to enhancing the in-flight stabilization of rotary wing aircraft. More specifically, the present invention is directed to stability augmentation systems for aircraft and especially to apparatus for automatically changing the gain of such stability augmentation systems. Accordingly, the general objects of the present invention are to provide novel and improved methods and apparatus of such character.

2. Description of the Prior Art

While not limited thereto in its utility, the present invention has been found to be particularly well suited for use in enhancing the controllability of vertical takeoff aircraft of the rotary wing type. Such aircraft are, of course, generally known in the art as helicopters. It is well known that a helicopter has inherent dynamic instability. Thus, in the absence of automatic flight control apparatus, the maneuvering of a helicopter requires that an exceptional amount of pilot attention be directed to achieving stability about the roll, pitch and yaw axes. The required degree of attention to the control function severely limits the pilot's ability to perform other necessary functions such as navigation and observation.

The operational problems associated with the instability of a helicopter, as briefly discussed above, have led to the design of stability augmentation systems which are intended merely to improve the stability of the aircraft, such stability augmentation systems providing the desired stabilization without altering the pilot's ability to exercise control and, preferably, without varying the "feel" of the control mechanisms such as the collective and cyclic pitch sticks. Thus, stability augmentation systems permit a helicopter to be flown "hands off" for limited periods of time. A stability augmentation system must be contrasted with an automatic pilot; the latter holding the aircraft on a preselected course and altitude at a preselected attitude during steady state flight conditions.

Some of the requirements of a stabilization augmentation system have been briefly discussed above. In addition to the obvious requirements of reliability and capability of producing dynamic stability about all three axes of movement of the aircraft, such stabilization systems must be functional throughout the operative ranges of speed and power of the craft. It is also exceedingly important that a stability augmentation system be capable of producing dynamic stability for all loading conditions; the loading conditions affecting the gross weight and center of gravity of the aircraft.

In the prior art, stability augmentation systems have lacked the ability to identify helicopter gross weight and center of gravity from in-flight measurements thereby permitting the changing of the augmentation system gains with variation in the aircraft loading. Thus, in prior art stability augmentation systems the gains were either fixed, were varied with airspeed, or were varied by means of an adaptive controller. Fixed gains are naturally a compromise and usually produce marginal performance at other than the design flight conditions. Variation of the stabilization system gains with airspeed alone has not proven to be a sufficient solution and adaptive controllers are complex, expensive and somewhat lacking in reliability. To summarize, the inability of prior art helicopter stability augmentation systems to respond to center of gravity and load weight changes has, particularly in combat zones where loads must be placed aboard and removed from the aircraft quickly and without concern for placement, greatly increased the need for pilot attention to the actual flying of the aircraft at the expense of other duties such as navigation and observation and otherwise rendered the actual control of the aircraft more difficult.

SUMMARY OF THE INVENTION

The present invention overcomes the above discussed and other deficiencies and disadvantages of the prior art by providing for the identification of helicopter gross weight and center of gravity from in-flight measurements and for changing the gains of a stability augmentation system in accordance with changes in these parameters. Thus, in accordance with a preferred embodiment of the invention, airspeed is measured and delivered as an input to function generators which provide output signals corresponding to the cyclic and collective pitch stick trim positions which would be used for straight and level flight at the particular airspeed if the aircraft were at midgross weight and neutral center of gravity. The outputs of these function generators are compared, when it is determined that the aircraft is in trim, with the actual stick positions to provide gain command signals to the stability augmentation system gain changing mechanism.

BRIEF DESCRIPTION OF THE DRAWING

The present invention may be better understood and its numerous objects and advantages will become apparent to those skilled in the art by reference to the accompanying drawing which is a block diagram of a preferred embodiment of the invention.

DESCRIPTION OF THE PREFERRED EMBODIMENT

With reference now to the drawing, the airspeed of the helicopter or other aircraft on which the present invention is employed is measured, in the manner known in the art, by an airspeed sensor 20 which provides an analog output signal having a magnitude commensurate with the instantaneous actual forward airspeed. The output of airspeed sensor 10 is delivered to a pair of function generators 12 and 14. Function generators 12 and 14 will be state-of-the-art diode function generators each of which produce an analog output signal having magnitude related to the input signal in accordance with a predetermind curve. Function generator 12, the gross weight function generator, "stores" a curve of the collective pitch stick trim position versus airspeed for a gross weight in the middle of the load carrying range of the particular type of aircraft. Function generator 14, the center of gravity function generator, "stores" a curve of cyclic pitch stick trim position versus airspeed for the neutral center of gravity condition for the particular type of aircraft. Accordingly, function generator 12 will provide an output signal commensurate with the collective pitch stick trim position for the measured dependent variable; i.e., the existing airspeed; if the aircraft was in straight and level flight with a load corresponding to the mid-gross weight. The output of function generator 14 will be an analog signal commensurate with the cyclic pitch stick position which would produce a trim condition with the existing airspeed and neutral center of gravity.

The output of function generator 12 is applied, via summing circuits 16 and 18, to comparators 20 and 22 and also directly to a comparator 24. For purposes which will become obvious from the discussion below, a positive bias is added to the collective stick trim position signal in summing circuit 16 while a negative bias is added in summing circuit 18. The comparators 20, 22 and 24 will typically comprise high gain operational amplifiers connected open loop. The outputs of these three comparators will, accordingly, essentially be in the form of a binary code; i.e., the comparator output signals will either be at a "zero" or "one" level.

The second input to each of comparators 20, 22 and 24 is derived from a transducer 26 mechanically coupled to the collective pitch stick. Transducer 26, which will typically be a potentiometer, will provide an analog signal commensurate with the actual collective pitch stick position. Comparators 20, 22 and 24 will be enabled, in the manner to be described below, only subsequent to the aircraft being in trim; the enabling signals being provided by the output of a "timer switch" 28. Comparator 20 will provide an output signal; i.e, the output of comparator 20 will be a "one", if the signal commensurate with the actual collective stick position is greater than the trim stick position signal plus the bias signal added at summing circuit 16. Comparator 14 will provide an output signal whenever the signal commensurate with actual collective stick position exceeds the trim stick position signal. Comparator 22 will provide an output signal whenever the signal commensurate with actual collective stick position exceeds the trim stick position signal less the bias added at summing circuit 18. Accordingly, presuming that comparators 20, 22 and 24 have been enabled, if the actual gross weight is below a predetermined mid-range of the aircraft, none of the comparators will provide an output signal and the gain of the stability augmentation system will not be adjusted. If, however, the actual gross weight is in the lower portion of the mid-range of the aircraft, comparator 22 only will provide an output signal which will, in the manner to be described below, cause a variation of the gain of the stability augmentation system. If the actual gross weight is in the higher portion of the mid-range for the aircraft, both of comparators 22 and 24 will provide output signals. If the actual gross weight as determined by the comparison of the actual collective position with the position the collective stick would assume with the aircraft in trim with gross weight in the mid-range, is above the mid-range, as determined by the bias added to the output signal of function generator 12 in summing circuit 16, all of comparators 20, 22 and 24 will provide output signals.

The output of function generator 14 is delivered to a further comparator circuit 30. Comparator circuit 30 will, like the comparators 20, 22 and 24, typically comprise a high gain operational amplifier. The second input to comparator 30 is derived from a transducer 32 coupled to the cyclic pitch control stick. Transducer 32, which will typically be a potentiometer, will thus provide a signal to comparator 30 commensurate with the actual cyclic pitch stick position. Comparator 30 will also receive the enabling signal from timer switch 28 and thus will remain inoperative until such time as the aircraft has achieved a trimmed condition.

Circuit 30 compares the signal commensurate with actual cyclic pitch stick position, as provided by sensor 32, with the signal from function generator 14 commensurate with the trim cyclic pitch stick position which would result from operation with a neutral central of gravity at the existing airspeed. Comparator 30 provides an output signal, which is delivered to the stability augmentation system gain changing circuitry, when the results of the comparison performed by circuit 30 indicate that the actual center of gravity of the aircraft is displaced from the neutral point. Since the present invention consists of a portion of an augmentation system which effectively augments pilot generated input commands, the system functions in the same manner regardless of whether the load is off the neutral point toward the front or rear of the aircraft; the required augmentation action being the same in either case.

The input signals which are combined to determine whether the comparators 20, 22, 24 and 30 should be enabled are generated by an accelerometer 34, a rate of climb sensor 36 and a rate of turn sensor 38. These signals from sensors 34, 36 and 38, which are devices standardly employed on helicopters, are delivered respectively to filters 40, 42 and 44. The purpose of the filter circuits is to delay signals from the sensors thus suppressing any transients such as might be caused by a wind gust. The signals commensurate with rate of climb and rate of turn are summed, in a summing circuit 46, and the resulting output signal from circuit 46 is thereafter summed with the signal commensurate with aircraft acceleration, as derived by sensor 34, in a summing circuit 48. The output of summing circuit 48 will thus be a signal indicative of the fact that the aircraft is being maneuvered by the pilot. Such a maneuver would comprise a takeoff after a change in loading. The appearance of a signal at the output of summing circuit 48 is indicative of the fact that the pilot has not achieved a trim condition with his collective and cyclic pitch controls. This output signal from summing circuit 48 is delivered as the input to the timer switch 28. Timer switch 28 includes a bistable circuit which generates the comparator enable output signal whenever the timer switch does not receive an input from summing circuit 48. Thus, the comparators will be enabled when the outputs of the load factor accelerometer 34, rate of climb sensor 36, which may comprise a barometric altitude measuring device, and rate of turn sensor 38, which may comprise a gyro, indicate that the desired flight altitude and course have been achieved and the aircraft has been brought into a "stable" condition by the pilot.

The output signals from comparators 20, 22, 24 and 30 are respectively delivered as the control inputs to electronic switching circuits 50, 52, 54 and 56. Switches 50, 52 and 54 are connected in the feedback circuit to a power amplifier 58. Amplifier 58 receives, via a summing circuit 60, an input signal corresponding to the stability augmentation feedback, typically pitch rate, roll rate, or yaw rate. Such feedback signals are known in the art and comprise part of prior art stability augmentation systems. The command signal delivered to amplifier 58 is simplified and supplied to a servo system which actually controls the pitch of the rotor blades. With the gross weight of the aircraft in the mid-range, the magnitude of the negative feedback to amplifier 58 will be determined by the resistance of a feedback circuit indicated schematically at K. Should the operating conditions, as discussed above result in comparator 22 providing an output signal, normally closed switch 52 will be opened and the feedback path around amplifier 58 will be modified by the addition of resistance in series with that provided by circuit K; this additional feedback circuit or resistance being indicated schematically at K'. Upon the reclosing of switch 52, the negative feedback will be reduced. Similarly, upon the closing of switches 54 and 50, respectively in response to an output signal being provided by comparators 24 and 20, the negative feedback around amplifier 58 will be further reduced in stepwise fashion. As the negative feedback is reduced the output of the amplifier will, of course, be increased for a given input signal level. Thus, the gain of the stability augmentation system will be varied in stepwise fashion in accordance with the deviation of the aircraft gross weight above or below the mid-range of allowable gross weight.

Switch 56 is connected, in the same manner as switches 50 and 54 as discussed above, so as to reduce the negative feedback around amplifier 58 when an output from comparator 30 indicates that the center of gravity of the aircraft is shifted away from the neutral point for the existing airspeed. Upon the closing of swich 56 the negative feedback around amplifier 58 will be reduced and the amplifier output for a given input signal level will be increased.

While a preferred embodiment has been shown and described, various modifications and substitutions may be made thereto without departing from the spirit and scope of the invention. By way of example, the gross weight implementation of the gain control of the present invention has been shown including three comparators while the center of gravity implementation has been shown including only a single comparator. It will be obvious to those skilled in the art that any desired number of comparators, as determined by the degree of resolution required, can be employed in each of the gross weight and center of gravity resolvers. Similarly, to enhance accuracy the function generators 12 and 14 may in actual practice comprise a plurality of separate function generators. It will also be obvious to those skilled in the art that the gain of amplifier 58 may be raised, rather than lowered, if the stability augmentation requirements so dictate. Accordingly, it will be understood that the present invention has been described by way of illustration and not limitation.

What is claimed is:

1. A method for varying the operation of a stability augmentation system of an aircraft comprising the steps of:
   calculating the position of a first control member as a function of a presumed gross weight and the actual value of a first aircraft dynamic parameter;
   calculating the position of a second control member as a function of a preselected center of gravity condition and the actual value of said first aircraft dynamic parameter;
   detecting the actual positions of the first and second control members;
   comparing the actual and calculated positions of the first control member to determine whether actual gross weight has varied from the presumed value;
   comparing the actual and calculated positions of the second control member to determine whether the actual center of gravity has deviated from the preselected position; and
   adjusting the effect of the stability augmentation system on aircraft operation whenever the actual gross weight exceeds the presumed value or the actual center of gravity has deviated from the preselected position.

2. The method of claim 1 wherein the aircraft is of the rotary wing type, the first aircraft dynamic parameter is the airspeed of the aircraft and said method further comprises the step of:
   measuring the forward airspeed of the aircraft.

3. The method of claim 2 further comprising the steps of:
   sensing the mode of flight of the aircraft; and
   delaying adjustment of the effect of the stability augmentation system until the sensing of the mode of flight indicates that the aircraft is not being maneuvered by the pilot.

4. The method of claim 3 wherein the first control member is a collective pitch stick and the second member is a cyclic pitch stick.

5. In a stability augmentation system for a rotary wing aircraft, the stability augmentation system including a power amplifier for enhancing control signals delivered thereto, the stability augmentation system receiving input signals commensurate with collective pitch control stick position, cyclic pitch control stick position and airspeed, the improvement comprising:
   first function generator means, said first function generator means being responsive to the airspeed signal for generating an output signal commensurate with collective pitch stick position for the existing airspeed and a preselected aircraft gross weight;
   second function generator means, said second function generator means being responsive to the airspeed signal for generating an output signal commensurate with cyclic pitch stick position for the existing airspeed and neutral aircraft center of gravity;
   first comparator means, said first comparator means receiving the collective pitch stick position signal from said first function generator and the actual collective pitch stick position signal, said first comparator means providing an output signal when the actual collective pitch stick position varies in a first direction from the position corresponding to the output signal of said first function generator, said first comparator means output signal being indicative of actual gross weight exceeding the preselected gross weight;
   second comparator means, said second comparator means receiving the cyclic pitch stick position signal from said first function generator means and the actual cyclic pitch stick position signal, said second comparator means providing an output signal when said actual cyclic pitch stick position varies from the cyclic pitch position corresponding to the output signal of said second function generator means, the output signal of said comparator means being indicative of a deviation of aircraft center of gravity from the neutral position; and
   means for varying the gain of the stability augmentation system power amplifier in response to an output signal from either of said first or second comparator means.

6. The apparatus of claim 5 wherein the stability augmentation system further receives signals commensurate with aircraft flight conditions and wherein said improvement further includes:

means responsive to signals commensurate with the aircraft flight conditions for generating a disabling signal when the aircraft is being maneuvered; and means for applying said disabling signal to said first and second comparator means whereby the stability augmentation system power amplifier gain will not be modified during maneuvering.

7. The apparatus of claim 6 wherein said flight condition signals are commensurate with acceleration, rate of climb and rate of turn and wherein said disabling signal generating means comprises:

filter means, said filter means receiving acceleration and rate of climb and rate of turn input signals and passing such received signals of long duration, said filter means thereby isolating said stability augmentation system from response to transient conditions; and summing circuit means responsive to signals passed by said filter means for generating a disabling signal when the aircraft is being maneuvered.

8. The apparatus of claim 5 wherein said stability augmentation system power amplifier gain varying means comprises:

gain changing circuit means connected between the input and output terminals of the stability augmentation system power amplifier, said gain changing circuit means including at least first and second switch means respectively responsive to the output signals of said first and second comparator means to effect a variation in the constants of said gain changing circuit.

9. The apparatus of claim 8 wherein said gain changing circuit means includes:

a first feedback circuit for the power amplifier, said first feedback circuit having a predetermind impedance;

a second feedback circuit for the power amplifier, said second feedback circuit having a predetermined impedance and being connected in parallel with said first feedback circuit, said second feedback circuit including a first of said switch means;

a third feedback circuit for the power amplifier, said third feedback circuit having a predetermined impedance and being connected in parallel with said first feedback circuit, said third feedback circuit including a second of said switch means.

10. The apparatus of claim 5 wherein at least said first comparator means comprises:

a plurality of comparator circuits, each of said comparator circuits receiving the signal commensurate with actual collective stick position as a first input, said comparator circuits each providing an output signal for application to said gain varying means;

means for applying the output signal of said first function generator means directly to a first of said comparator circuits; and means for delivering the output signal of said first function generator means to a second of said comparator circuits, said deliverng means including means for biasing the function generator output signal.

11. The apparatus of claim 9 wherein at least said first comparator means comprises:

a plurality of comparator circuits, each of said comparator circuits receiving the signal commensurate with actual collective stick position as a first input, said comparator circuits each providing an output signal for application to said gain varying means;

means for applying the output signal of said first function generator means directly to a first of said comparator circuits; and means for delivering the output signal of said first function generator means to a second of said comparator circuits, said delivering means including means for biasing the function generator output signal.

12. The apparatus of claim 8 wherein the stability augmentation system further receives signals commensurate with aircraft flight conditions and wherein said improvement further includes:

means responsive to signals commensurate with the aircraft flight conditions for generating a disabling signal when the aircraft is being maneuvered; and means for applying said disabling signal to said first and second comparator means whereby the stability augmentation system power amplifier gain will not be modified during maneuvering.

13. The apparatus of claim 9 wherein the stability augmentation system further receives signals commensurate with aircraft flight conditions and wherein said improvement further includes:

means responsive to signals commensurate with the aircraft flight conditions for generating a disabling signal when the aircraft is being maneuvered; and means for applying said disabling signal to said first and second comparator means whereby the stability augmentation system power amplifier gain will not be modified during maneuvering.

14. The apparatus of claim 13 wherein said flight condition signals are commensurate with acceleration, rate of climb and rate of turn and wherein said disabling signal generating means comprises:

filter means, said filter means receiving acceleration and rate of climb and rate of turn input signals and passing such received signals of long duration, said filter means thereby isolating said stability augmentation system from response to transient conditions; and summing circuit means responsive to signals passed by said filter means for generating a disabling signal when the aircraft is being manuevered,.

15. The apparatus of claim 14 wherein at least said first comparator means comprises:

a plurality of comparator circuits, each of said comparator circuits receiving the signal commensurate with actual collective stick position as a first input, said comparator circuits each providing an output signal for application to said gain varying means;

means for applying the output signal of said first function generator means directly to a first of said comparator circuits; and means for delivering the output signal of said first function generator means to a second of said comparator circuits, said delivering means including means for biasing the function generator output signal.

* * * * *

UNITED STATES PATENT AND TRADEMARK OFFICE
CERTIFICATE OF CORRECTION

PATENT NO. : 4,032,083
DATED : June 28, 1977
INVENTOR(S) : Joseph R. Maciolek

It is certified that error appears in the above-identified patent and that said Letters Patent are hereby corrected as shown below:

Column 2, line 46, "20" should be --10--

Column 3, line 30, "14" should be --24--

Column 3, line 50, after "collective" the word "stick" was omitted

Column 4, lines 5 and 6, "central" should be --center--

Column 4, line 63, "simplified" should be --amplified--

Signed and Sealed this

Fourteenth Day of February 1978

[SEAL]

Attest:

RUTH C. MASON
Attesting Officer

LUTRELLE F. PARKER
Acting Commissioner of Patents and Trademarks